(12) United States Patent
Choi

(10) Patent No.: US 12,246,782 B2
(45) Date of Patent: Mar. 11, 2025

(54) CONTAINER TRANSPORT SYSTEM USING AUTONOMOUS DRIVING METHOD AND CONTAINER TRANSPORT METHOD USING AUTONOMOUS DRIVING METHOD

(71) Applicant: Henry Choi, Cupertino, CA (US)

(72) Inventor: Henry Choi, Cupertino, CA (US)

( * ) Notice: Subject to any disclaimer, the term of this patent is extended or adjusted under 35 U.S.C. 154(b) by 0 days.

(21) Appl. No.: 18/429,298

(22) Filed: Jan. 31, 2024

(65) Prior Publication Data

US 2024/0166274 A1    May 23, 2024

Related U.S. Application Data

(63) Continuation of application No. PCT/KR2022/012989, filed on Aug. 30, 2022.

(30) Foreign Application Priority Data

Aug. 30, 2021    (KR) .......................... 10-2021-0115154

(51) Int. Cl.
  *B62D 49/00* (2006.01)
  *B62D 63/08* (2006.01)

(52) U.S. Cl.
  CPC ........... *B62D 49/007* (2013.01); *B62D 63/08* (2013.01)

(58) Field of Classification Search
  CPC ............. G06Q 10/083; G06Q 10/0832; G06Q 10/0833; G06Q 10/0835; G06Q 10/0837; G06Q 10/0838
  See application file for complete search history.

(56) References Cited

U.S. PATENT DOCUMENTS

| 2015/0105965 A1* | 4/2015 | Blackwell | ............ B62D 63/025 701/28 |
| 2016/0200153 A1* | 7/2016 | Rothstein | ............ B60C 23/0415 701/34.4 |

(Continued)

FOREIGN PATENT DOCUMENTS

| KR | 10-2018-0129242 A | 12/2018 |
| KR | 10-2020-0079528 A | 7/2020 |

OTHER PUBLICATIONS

Rezgui, Dhekra, et al. "Application of a variable neighborhood search algorithm to a fleet size and mix vehicle routing problem with electric modular vehicles." Computers & Industrial Engineering 130 (2019): 537-550. (Year: 2019).*

(Continued)

*Primary Examiner* — Emmett K. Walsh
(74) *Attorney, Agent, or Firm* — Revolution IP, PLLC

(57) ABSTRACT

A container transportation system using autonomous driving includes: a container to be transported; an autonomous vehicle docked with or undocked from the container and autonomously travelling to transport the container to a transport destination; and a management server controlling travelling of the autonomous vehicle, wherein the autonomous vehicle comprises a container coupling part coupled to the container, and the container comprises: a container body; a plurality of height adjustment pillars coupled to respective corners of a lower surface of the container body and adjustable in length to lift or lower the container body from or to the ground; and a vehicle coupling part formed on the lower surface of the container body and coupled to the container coupling part.

5 Claims, 17 Drawing Sheets

(56) References Cited

U.S. PATENT DOCUMENTS

| | | |
|---|---|---|
| 2018/0211217 A1* | 7/2018 | Berdinis .......... G06Q 10/06315 |
| 2018/0364738 A1 | 12/2018 | Bridges |
| 2019/0367105 A1 | 12/2019 | Grossman |
| 2020/0331544 A1 | 10/2020 | Köster |
| 2021/0046985 A1* | 2/2021 | Claesson ................... B60P 3/42 |

OTHER PUBLICATIONS

International Search Report of PCT/KR2022/012989 mailed Dec. 7, 2022.

* cited by examiner (a)

(b)

(a)

(b)

(c)

(a)

(b)

CONTAINER TRANSPORT SYSTEM USING AUTONOMOUS DRIVING METHOD AND CONTAINER TRANSPORT METHOD USING AUTONOMOUS DRIVING METHOD

CROSS REFERENCE TO RELATED APPLICATIONS

This application is a Continuation of PCT International Patent Application No. PCT/KR2022/012989 filed on Aug. 30, 2022, which claims priority to Korean Patent Application No. 10-2021-0115154 filed on Aug. 30, 2021 which are all hereby incorporated by reference in their entirety.

BACKGROUND OF THE INVENTION

The present invention relates to a container transportation system using autonomous driving and a container transportation method using autonomous driving and, more particularly, to a container transportation system using autonomous driving in which an autonomous vehicle automatically docks with a container and autonomously travels to transport the container to a transport destination, and a container transportation method using the same.

Leisure travel by car has been popular in the United States, which has a large landmass, and in Europe, where neighboring countries can be reached by land. Recently, with increase in interest in camping in Korea, long-term car trips have been carried out using campers equipped with various living facilities.

Besides campers, leisure travel by car uses a house car, which is a car having an interior designed for human habitation, a house trailer, which is a container on wheels that can be pulled by a car and is equipped with living facilities, and a camping truck, which is a truck having a living cabin on an undercarriage thereof.

Most such trailers have at least one set of wheels. In the case of a trailer having one set of wheels, a vehicle docks with the wheel-less side of a trailer to transport the trailer. In the case of a trailer having two sets of wheels, a separate docking device is provided to one side of the trailer such that a vehicle is docked therewith to pull or transport the trailer.

In the case of using a house trailer, in order for the towing vehicle to pull the trailer, a person needs to manually couple the vehicle to the trailer using separate couplers formed at the rear side of the vehicle.

Further, even after coupling the trailer to the vehicle, the trailer can sway back and forth or side to side during travelling, which can cause an accident due to separation of the trailer from the vehicle.

SUMMARY OF THE INVENTION

It is an object of the present invention to provide a container transportation system using autonomous driving in which an autonomous vehicle automatically docks with a container and autonomously travels to transport the container to a transport destination, and a container transportation method using the same.

The present invention is not limited thereto and other objects of the present invention will become apparent to those skilled in the art from the following description in conjunction with the accompanying drawings.

In accordance with one aspect of the present invention, there is provided a container transportation system using autonomous driving, including: a container to be transported; an autonomous vehicle docked with or undocked from the container and autonomously travelling to transport the container to a transport destination; and a management server controlling travelling of the autonomous vehicle, wherein the autonomous vehicle includes a container coupling part coupled to the container, and the container includes: a container body; a plurality of height adjustment pillars coupled to respective corners of a lower surface of the container body and adjustable in length to lift or lower the container body from or to the ground; and a vehicle coupling part formed on the lower surface of the container body and coupled to the container coupling part.

The container may further include: a container code attached to an outer side of the container body; and a pillar length adjustment unit adjusting a length of the height adjustment pillar.

The autonomous vehicle may further include: a vehicle code attached to a vehicle body; a vehicle code recognition unit recognizing the vehicle code; and a container code recognition unit recognizing the container code.

In accordance with another aspect of the present invention, there is provided a container transportation system using autonomous driving, including: a container to be transported; at least two autonomous vehicles docked with or undocked from the container and autonomously travelling to transport the container to a transport destination; and a management server controlling travelling of the autonomous vehicles, wherein each of the autonomous vehicles includes a container coupling part coupled to the container, and the container includes: a container body; a plurality of height adjustment pillars coupled to respective corners of a lower surface of the container body and adjustable in length to lift or lower the container body from or to the ground; and at least two vehicle coupling parts formed on the lower surface of the container body and coupled to the respective container coupling parts.

In accordance with yet another aspect of the present invention, there is provided a container transportation method using autonomous driving based on a container transportation system using autonomous driving, including: transmitting, by a management server, transport information of a container to be transported by an autonomous vehicle to the autonomous vehicle; moving the autonomous vehicle to a location at which the container is stored based on the transport information; coupling the autonomous vehicle to the container; transporting, by the autonomous vehicle, the container to a transport destination based on the transport information; and uncoupling the autonomous vehicle from the container.

The container transportation system using autonomous driving and the container transportation method using autonomous driving according to the present invention provide the following effects.

First, since the autonomous vehicle automatically docks with the container and autonomously travels to transport the container to a transport destination, high haulage costs incurred in transportation can be saved, thereby providing an economic benefit.

Second, since the autonomous vehicle moves to a location at which the container is stored based on the transport information and the vehicle body is automatically coupled to the container body through insertion of the container coupling part of the autonomous vehicle into the vehicle coupling part of the container, the cost associated with coupling a transportation vehicle to a container can be reduced by elimination of the need for a crane to mount the container on the transportation vehicle, thereby providing an economic benefit.

Third, since the autonomous vehicle moves to a location at which the container is stored based on the transport information and the vehicle body is automatically coupled to the container body through insertion of the container coupling part of the autonomous vehicle into the vehicle coupling part of the container, the time spent on manually coupling a transportation vehicle to a container can be saved, thereby ensuring fast delivery of goods.

DETAILED DESCRIPTION OF THE INVENTION

Figure 1:
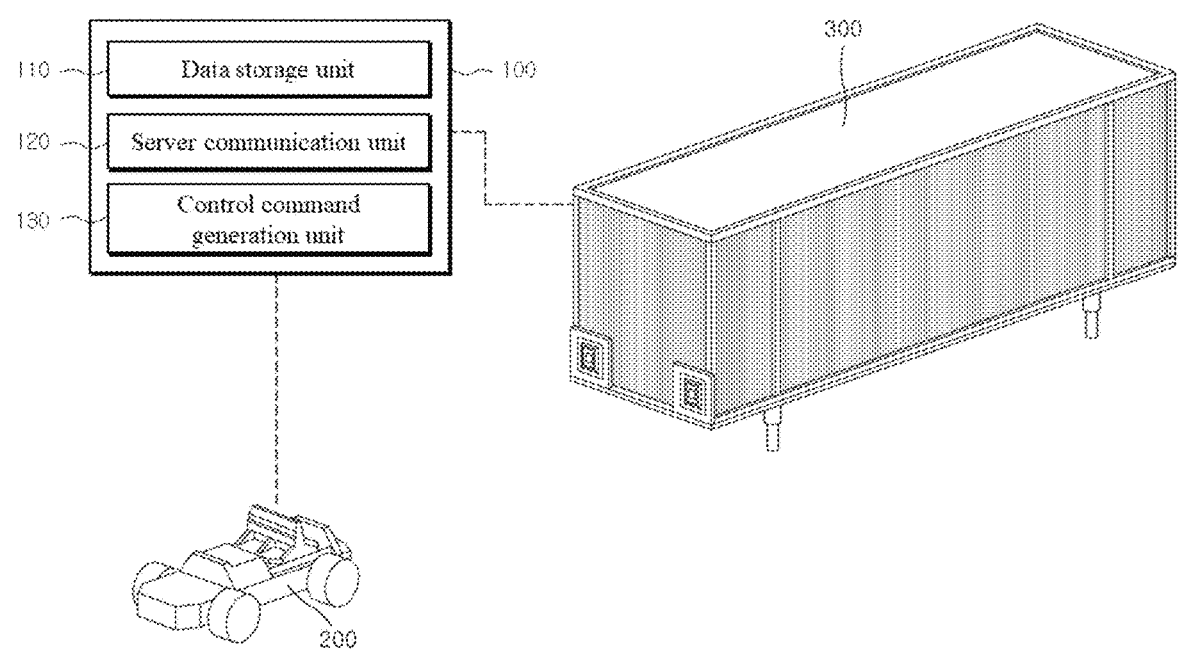
FIG. 1 is an overall schematic diagram of one embodiment of a container transportation system using autonomous driving according to the present invention.

The above and other aspects, features, and advantages of the present invention will become apparent from the detailed description of the following embodiments in conjunction with the accompanying drawings. It should be understood that the present invention is not limited to the following embodiments and may be embodied in different ways, and that the embodiments are provided for complete disclosure and thorough understanding of the present invention by those skilled in the art. The scope of the present invention is defined only by the claims Like components will be denoted by like reference numerals throughout the specification.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

It will be understood that when an element is referred to as being "connected" to or "on" another element, it can be directly on the other element, or intervening elements may also be present. In contrast, when an element is referred to as being "directly connected" to or "directly on" another element, there are no intervening elements present. The same is applied to other expressions for describing a relationship between elements.

Unless otherwise defined herein, all terms including technical or scientific terms used herein have the same meanings as commonly understood by those skilled in the art to which the present invention pertains. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

Hereinafter, a container transportation system using autonomous driving and a container transportation method using autonomous driving according to embodiments of the present invention will be described with reference to the accompanying drawings.

FIG. 1 is a schematic diagram illustrating one embodiment of a container transportation system using autonomous driving according to the present invention. Referring to FIG. 1, the container transportation system using autonomous driving according to the present invention includes a management server 100, an autonomous vehicle 200, and a container 300. In the following, the container transportation system using autonomous driving according to the present invention will be described with reference to FIG. 2 and FIG. 3 along with FIG. 1.

The management server 100 stores server data for controlling travelling of the autonomous vehicle 200 and operating the container 300 to control travelling of the autonomous vehicle 200 and operate the container 300. Specifically, the management server 100 includes a data storage unit 110, a server communication unit 120, and a control command generation unit 130.

The data storage unit 110 stores server data for controlling travelling of the autonomous vehicle 200 and operating the container 300, wherein the server data includes container transport information, container weight information, and code information attached to the container 300 and the autonomous vehicle 200 (a vehicle code 230 and a container code 320 described below).

The container transport information includes a storage location at which the container 300 to be transported is stored, a transport destination to which the container 300 is to be transported, a transport completion time by which the container 300 is to be transported to the transport destination, and an estimated transport time for the container 300 from the storage location to the transport destination.

The container weight information is information about an actual weight of the container 300 according to the weight of loads stored in the container 300.

The code information includes information about a container code 320 unique to the container 300 to be transported and a vehicle code 230 unique to the autonomous vehicle 200 responsible for transporting the container 300.

Description of the server communication unit 120 and the control command generation unit 130 of the management server 100 will be given after describing the autonomous vehicle 200 and the container 300 in detail.

The autonomous vehicle 200 is docked with or undocked from the container 300 to be transported, and autonomously travels to transport the container 300 from the storage location to the transport destination.

Figure 2:
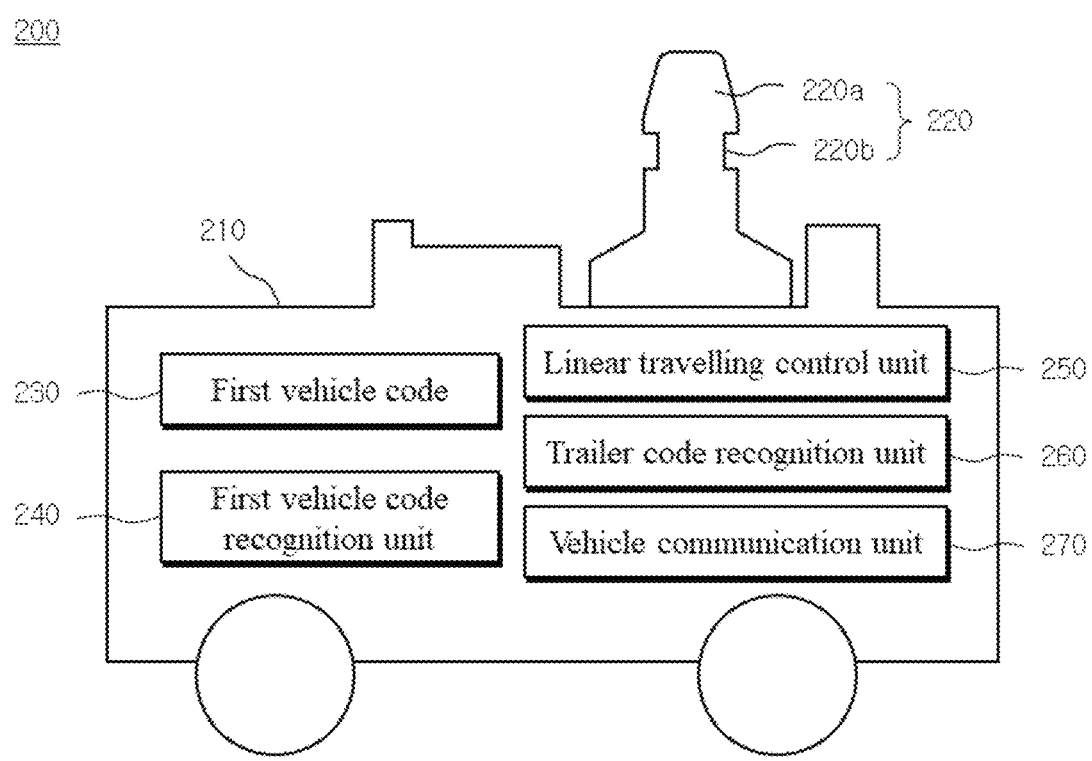
FIG. 2 is a schematic diagram of an autonomous vehicle of the container transportation system using autonomous driving according to the present invention.

FIG. 2 is a schematic diagram of the autonomous vehicle 200 of the container transportation system using autonomous driving according to the present invention. Specifically, the autonomous vehicle 200 includes a vehicle body 210, a container coupling part 220, a vehicle code 230, a container code recognition unit 260, and a vehicle communication unit 270.

The vehicle body 210 of the autonomous vehicle is adapted to allow the container 300 to be placed on an upper surface thereof and supports the container 300 during transportation of the container 300 to the transport destination.

Here, the upper surface of the vehicle body 210 is formed in a planar shape to secure a large contact area between the upper surface of the vehicle body 210 and a lower surface of the container 300 upon placement of the container 300 on the vehicle body 210 and to allow the container 300 to remain balanced during transport.

The container coupling part 220 protrudes from the upper surface of each vehicle body 210 to be coupled to a lower portion of the container 300. Specifically, the container coupling part 220 includes a docking body 220a and a groove 220b.

The docking body 220a has a lower portion coupled to the upper surface of the vehicle body 210 and an upper portion having a curved shape or having a side surface cut at a predetermined angle.

The groove 220b is formed at a center of the docking body 220a such that the center of the docking body 220a is smaller in length and area than upper and lower surfaces of the docking body 220a.

The vehicle code 230 stores unique information (identity) for each vehicle body 210. A different vehicle code 230 is attached to each vehicle body 210.

The container code recognition unit 260 recognizes a container code 320 attached to the container 300 to be transported, which will be described further below along with description of the container 300.

The vehicle communication unit 270 communicates with the server communication unit 120 to receive the server data from the server communication unit 120 to enable the vehicle body 210 to transport the container 300 from the storage location to the transport destination.

In addition, the vehicle communication unit 270 transmits pairing status information of the vehicle body 210 and container code recognition information to the server communication unit 120, which will be described in detail further below.

The container 300 is transported by the autonomous vehicle 200 from the storage location to the transport destination. Specifically, the container 300 includes a container body 310, a container code 320, a height adjustment pillar 330, a pillar length adjustment unit (not shown), a vehicle coupling part 340, and a container communication unit 350.

Figure 3:
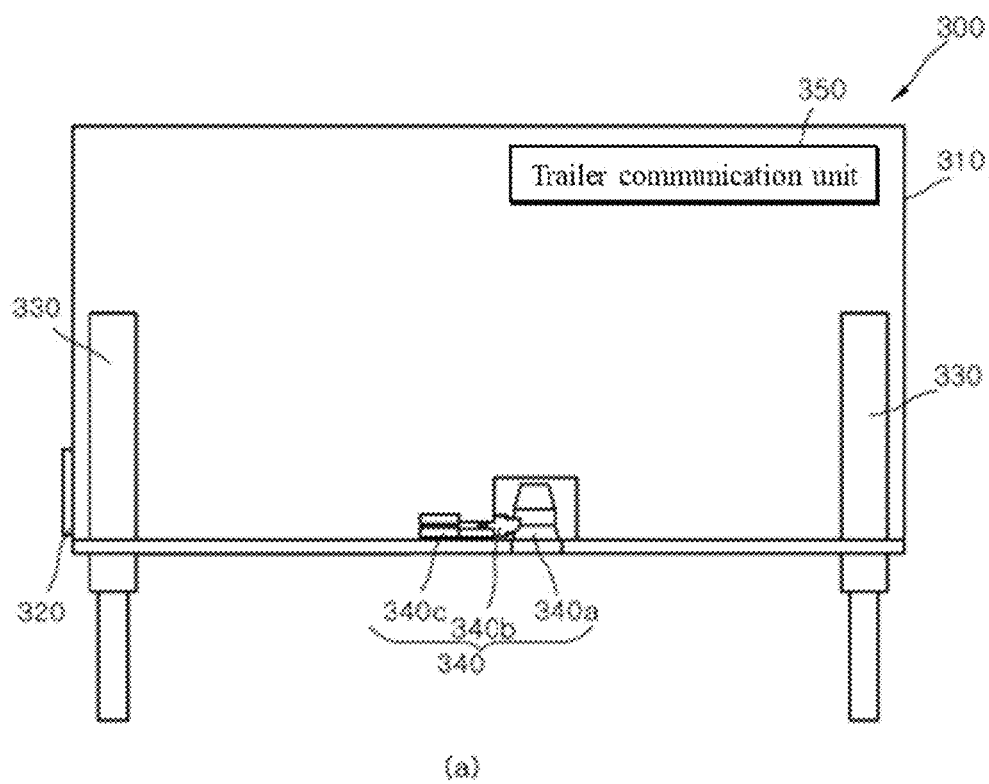
FIG. 3 is a schematic view of a container of the container transportation system using autonomous driving according to the present invention.
Figure 3:
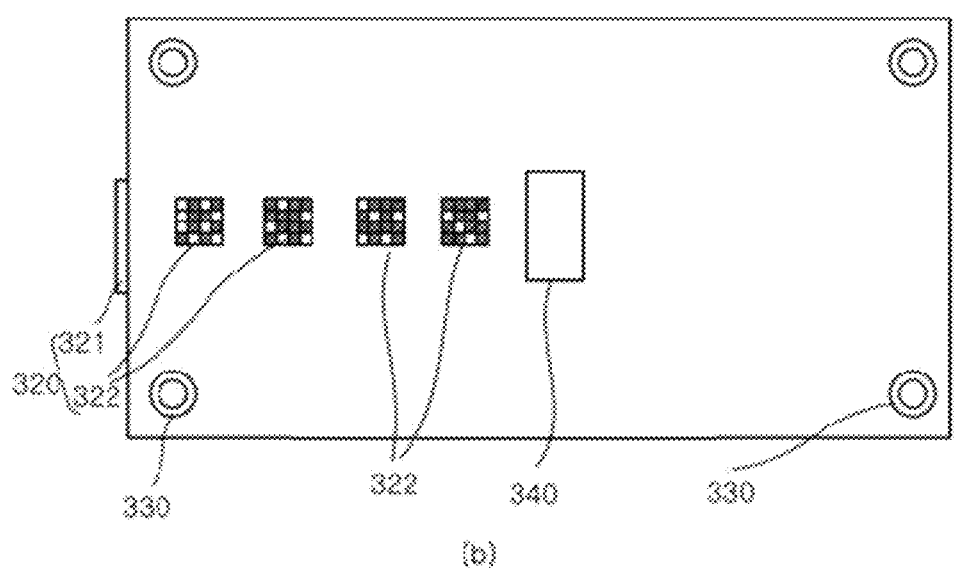

FIG. 3 is a schematic view of the container 300 of the container transportation system using autonomous driving according to the present invention, wherein FIG. 3(a) is a side view of the container 300 and FIG. 3(b) is a bottom view of the container 300. As shown in FIG. 3, loads are loaded inside the container body 310.

The container code 320 is attached to an outer side of the container body 310. Specifically, the container code 320 includes a container identification code 321 and a container position code 322.

The container identification code 321 is a code attached to the container body 310 to identify whether the container 300 is a target container 300 to be transported by the autonomous vehicle 200, and is disposed on a side surface of the container body 310.

The container position code 322 is a code guiding a position of the vehicle coupling part 340 to allow the container coupling part 220 of the autonomous vehicle 200 to be aligned with the vehicle coupling part 340, and is disposed on an underside of the container body 310.

The height adjustment pillar 330 is coupled to an edge of a lower surface of the container body 310 and is adjustable in length to move the container body 310 up (or down) from (or to) the ground.

The pillar length adjustment unit adjusts the length of the height adjustment pillar 330. An example of how the pillar length adjustment unit adjusts the length of the height adjustment pillar 330 will be described further below.

The vehicle coupling part 340 is formed at a center of the lower surface of the container body 310 and allows the container coupling part 220 to be inserted thereinto and coupled thereto.

Specifically, the vehicle coupling part 340 includes an insertion hole 340a, a fastening bar 340b, and a spring 340c.

The insertion hole 340a is formed on the lower surface of the container body 310 in a shape corresponding to the shape of the docking body 220a such that the docking body 220a can be inserted into the insertion hole 340a.

The fastening bar 340b is disposed at a side of the insertion hole 340a, wherein at least a portion of the fastening bar 340b protrudes into the insertion hole 340a and the other portion of the fastening bar 340b is connected to the spring 340c.

That is, as the docking body 220a is inserted into the insertion hole 340a, the fastening bar 340b is pressed by the docking body 220a to be moved in a direction away from the insertion hole 340a and then, when the fastening bar 340b and the groove 220b are positioned in parallel to each other as the docking body 220a is fully inserted into the insertion hole 340a, the fastening bar 340b is moved back toward the insertion hole 340a by restoring force of the spring 340c to be inserted into the groove 220b. As a result, the vehicle coupling part 340 is coupled to the container coupling part 220, whereby the autonomous vehicle 200 is coupled to the container body 310.

The container communication unit 350 communicates with the server communication unit 120 to transmit the container weight information and information indicating completion of coupling between the vehicle coupling part 340 and the container coupling part 220 to the server communication unit 120 of the management server 100.

In the following, the server communication unit 120 and the control command generation unit 130 of the management server 100 will be described.

The server communication unit 120 communicates with the vehicle communication unit 270 and the container communication unit 350 to transmit the server data to the autonomous vehicle 200. In addition, the server communication unit 120 receives the pairing status information of the vehicle body 210 and the container code recognition information from the vehicle communication unit 270 and receives the container weight information and the information indicating completion of coupling between the vehicle coupling part 340 and the container coupling part 220 from the container communication unit 350.

The control command generation unit 130 generates a control command to operate the autonomous vehicle 200 and the container 300 based on the information received from the vehicle communication unit 270 and the container communication unit 350, which will be described in detail further below.

Figure 4:
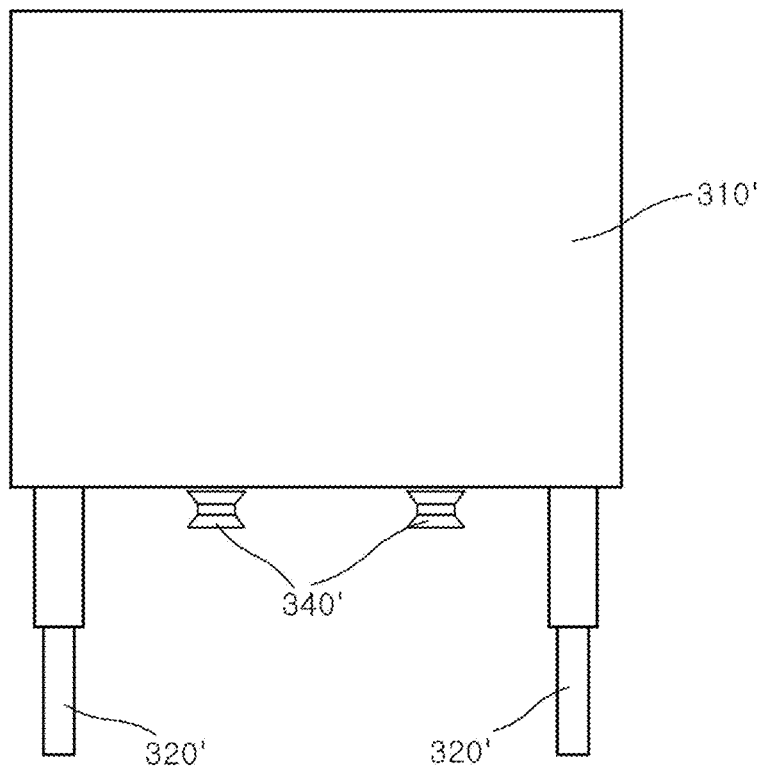
FIG. 4 is a schematic view of another embodiment of the container of the container transportation system using autonomous driving according to the present invention.
Figure 5:
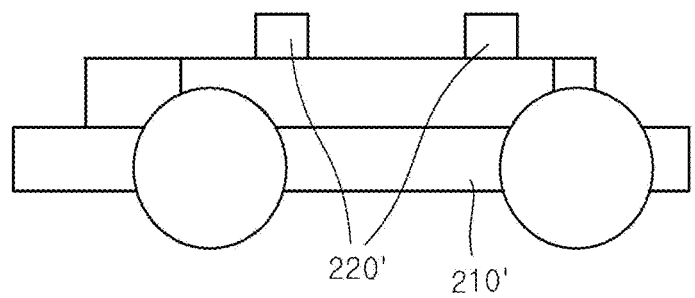
FIG. 5 is a schematic view of another embodiment of the autonomous vehicle of the container transportation system using autonomous driving according to the present invention.
Figure 6:
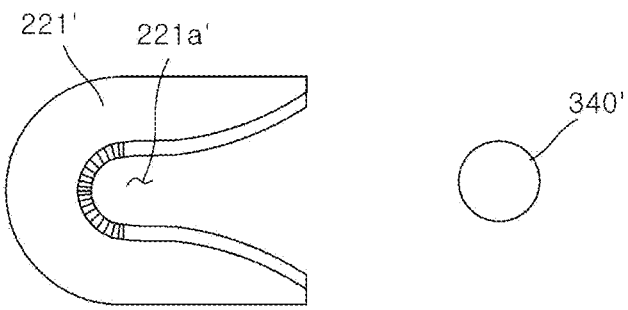
FIG. 6 is a view of another embodiment of a container coupling part and a vehicle coupling part of the container transportation system using autonomous driving according to the present invention.
Figure 6:
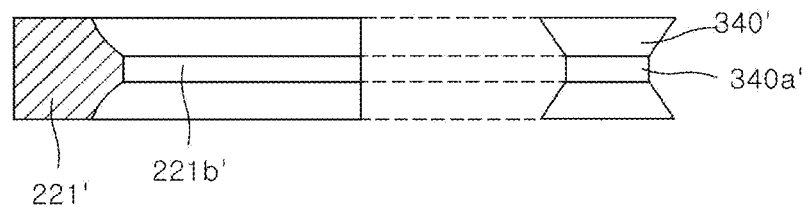
Figure 6:
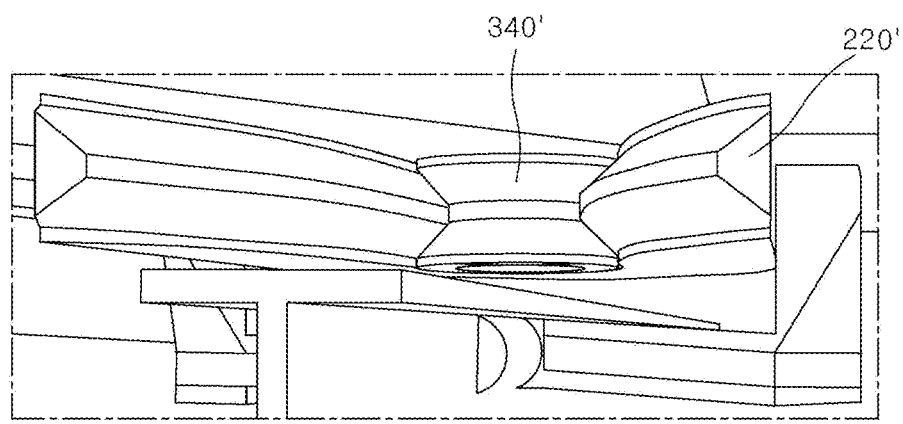

FIG. 4 to FIG. 6 illustrate another embodiment of the container coupling part and the vehicle coupling part of the container transportation system using autonomous driving according to the present invention. In the following, a container coupling part 220' and a vehicle coupling part 340' of the container transportation system using autonomous driving according to the present invention will be described with reference to FIG. 4 and FIG. 6.

According to this embodiment, the container may include a plurality of vehicle coupling parts 340' coupled to a lower portion of the container body. Each of the plurality of vehicle coupling parts 340' has a cylindrical shape and is formed with a groove 340a' at a center thereof in a longitudinal direction of the vehicle coupling part 340', wherein a surface connected from upper and lower surfaces of the vehicle coupling part 340' to the groove 340a' may be tapered.

In addition, according to this embodiment, the autonomous vehicle may include a plurality of container coupling parts 220', wherein each of the container coupling parts 220' protrudes from the upper surface of the vehicle body 210 to be coupled to a lower portion of the container 300. Specifically, the container coupling part 220' includes a docking body 221' and a coupling protrusion 221b'.

The docking body 221' is formed in the shape of a horseshoe, that is, a "U" shape, as shown in FIG. 6, such that the vehicle coupling part 340' is inserted into and mounted on a mounting portion 221a' corresponding to an open region of the docking body 221'.

The coupling protrusion 221b' is formed on a surface of the docking body 221' facing the mounting portion 221a' to be coupled to the groove 340a' of the vehicle coupling part 340' described above. Here, the coupling protrusion 221b' corresponds in shape to the groove 340a' to prevent the container coupling part 220' and the vehicle coupling part 340' coupled to each other from vibrating up and down.

The detailed description of the container transportation system using autonomous driving according to the present invention may be applied to a container transportation method using autonomous driving according to the present invention described below.

Figure 7:
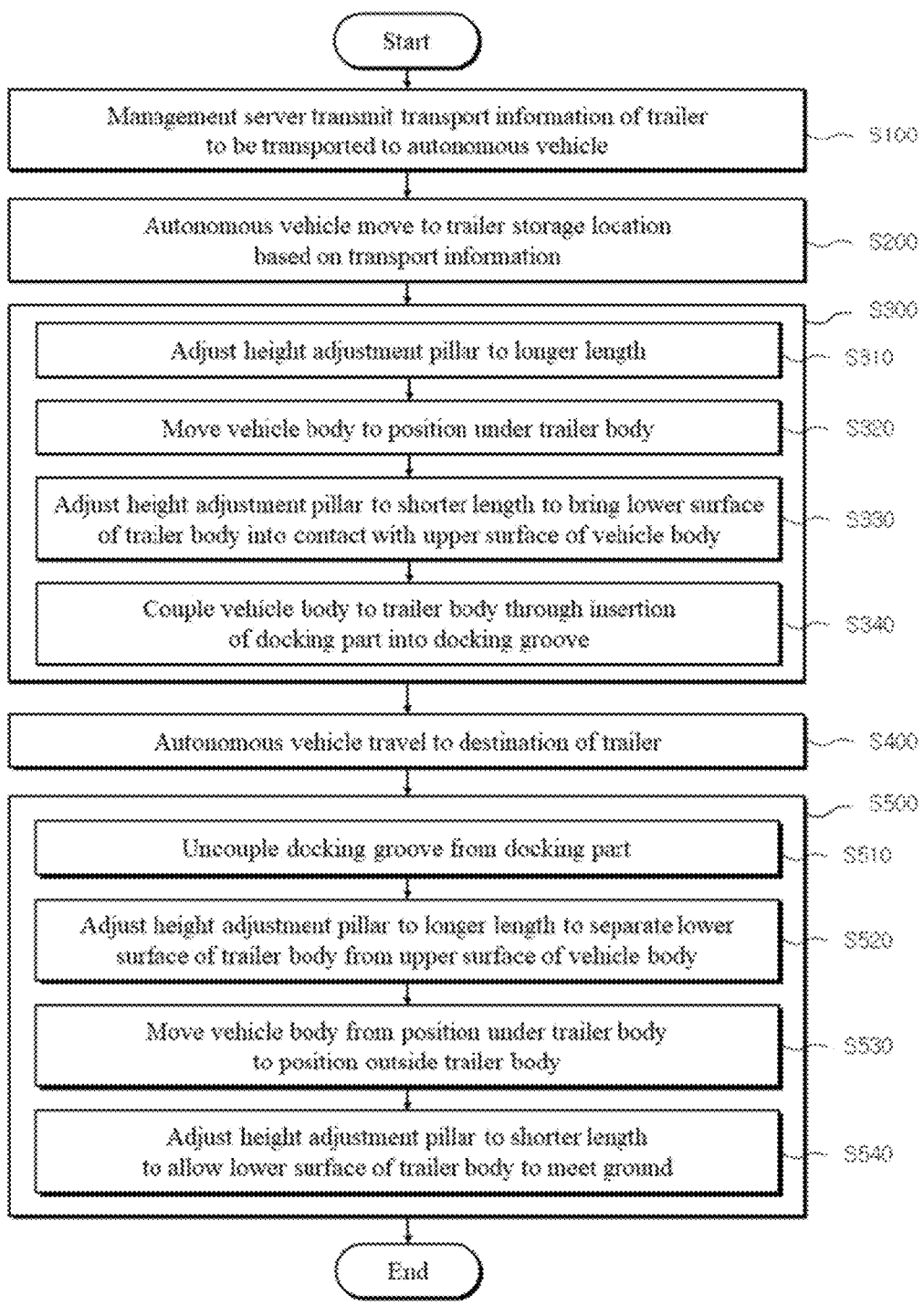
FIG. 7 is a flow diagram of one embodiment of a container transportation method using autonomous driving according to the present invention.
Figure 8:
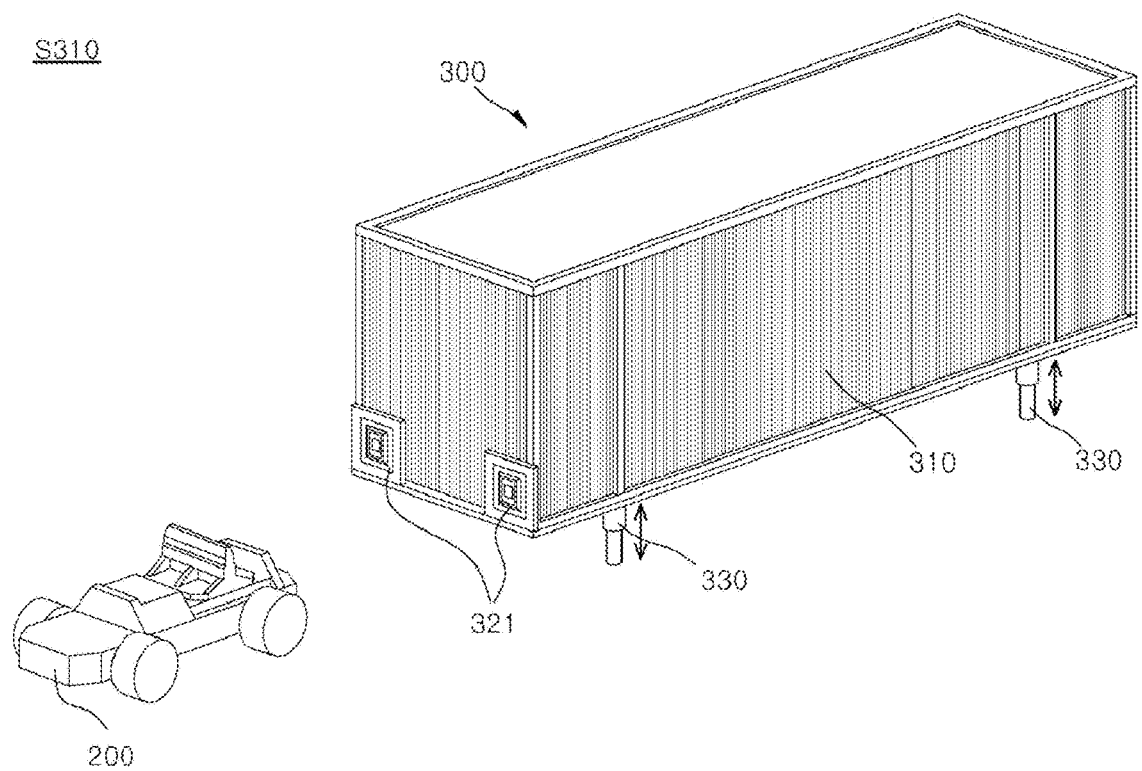
FIG. 8 to FIG. 11 are views illustrating a coupling step of the container transportation method using autonomous driving according to the present invention.
Figure 9:
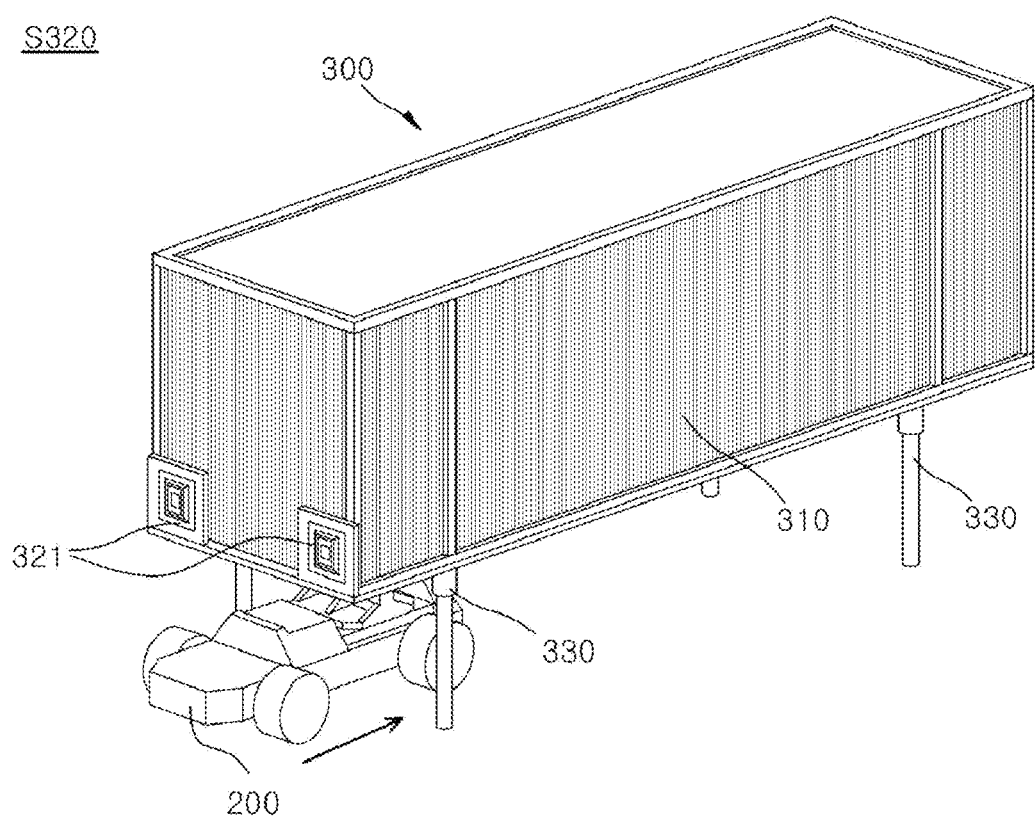
Figure 10:
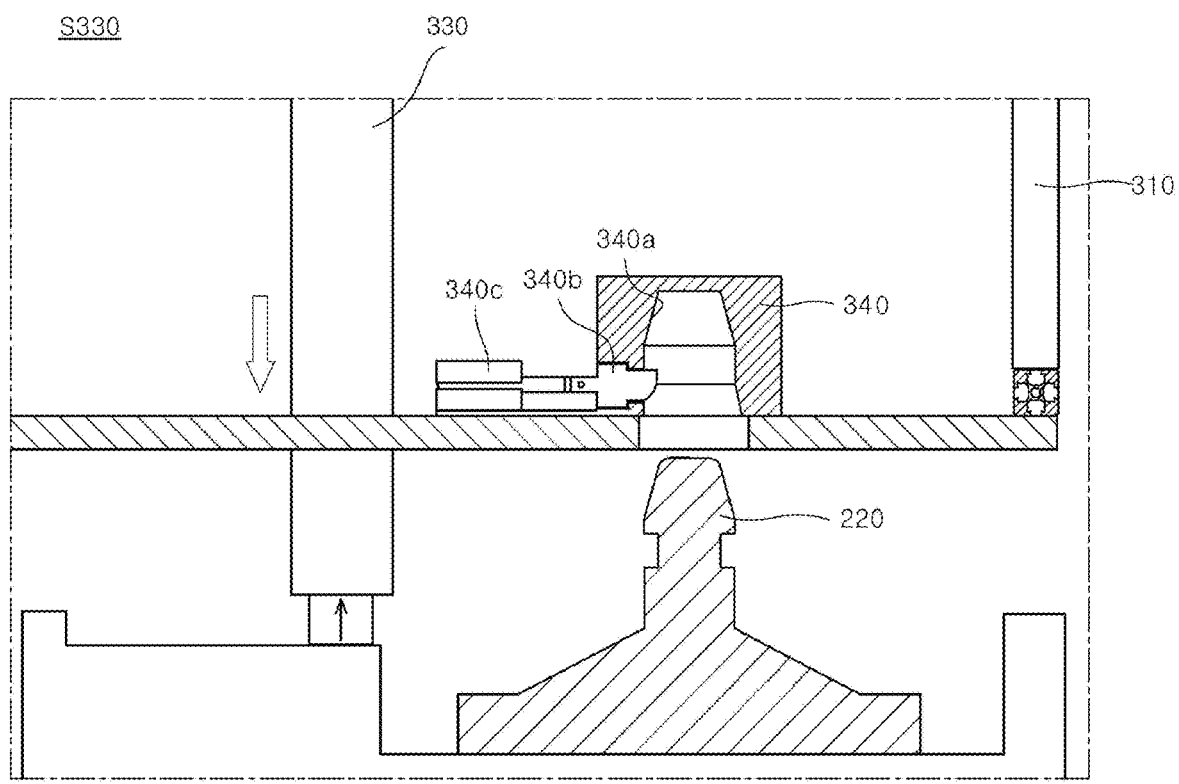
Figure 11:
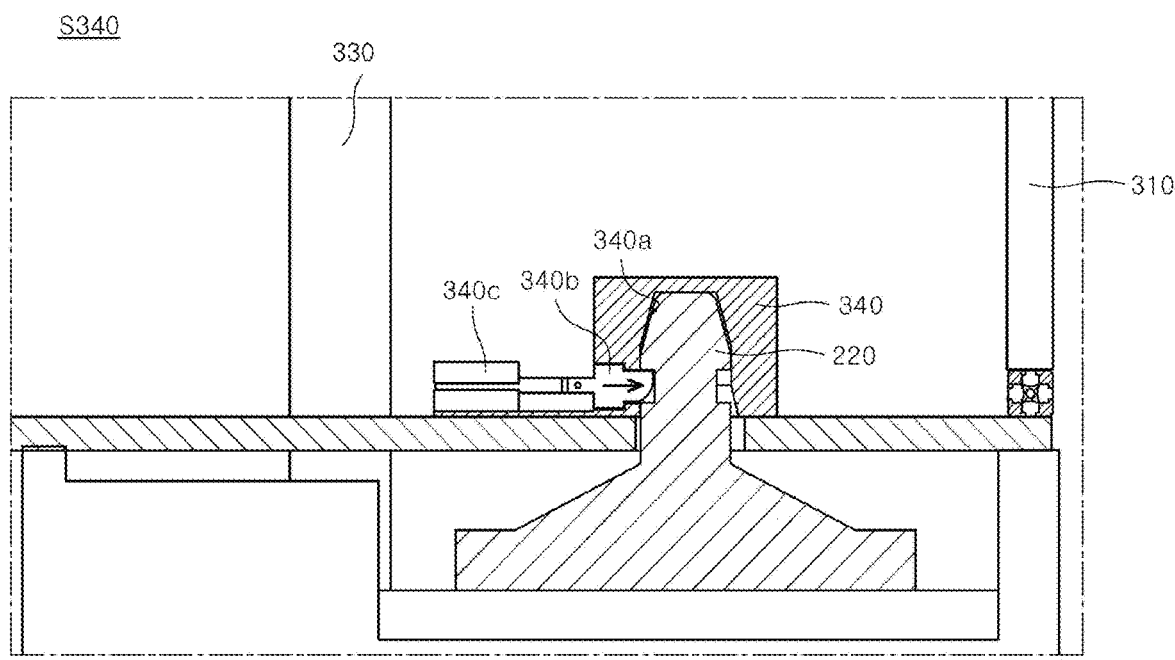
Figure 12:
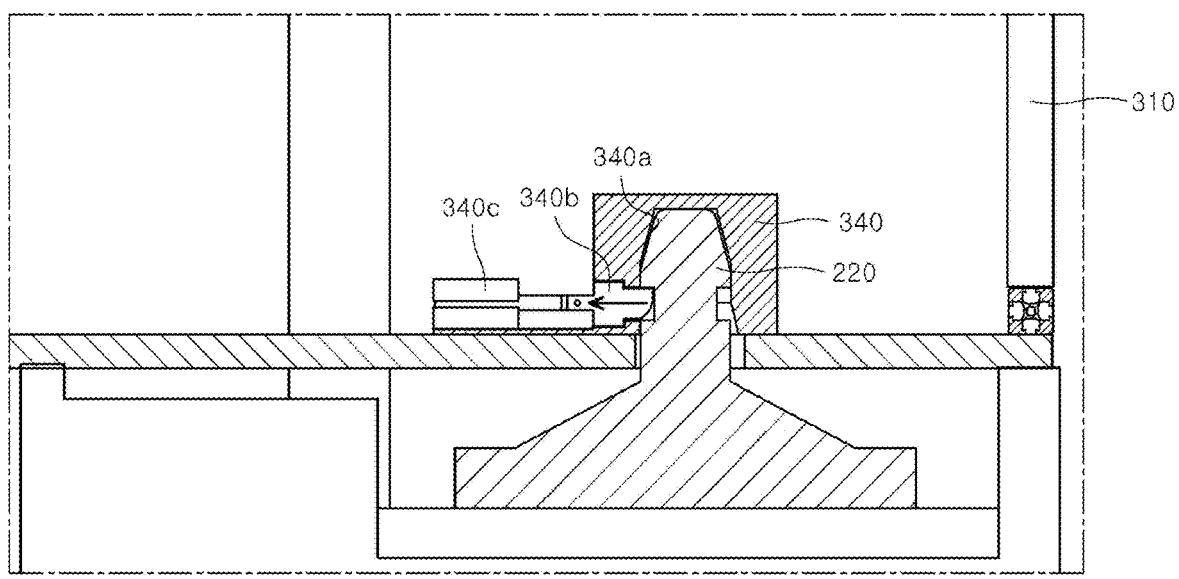
FIG. 12 to FIG. 15 are views illustrating an uncoupling step of the container transportation method using autonomous driving according to the present invention.
Figure 13:
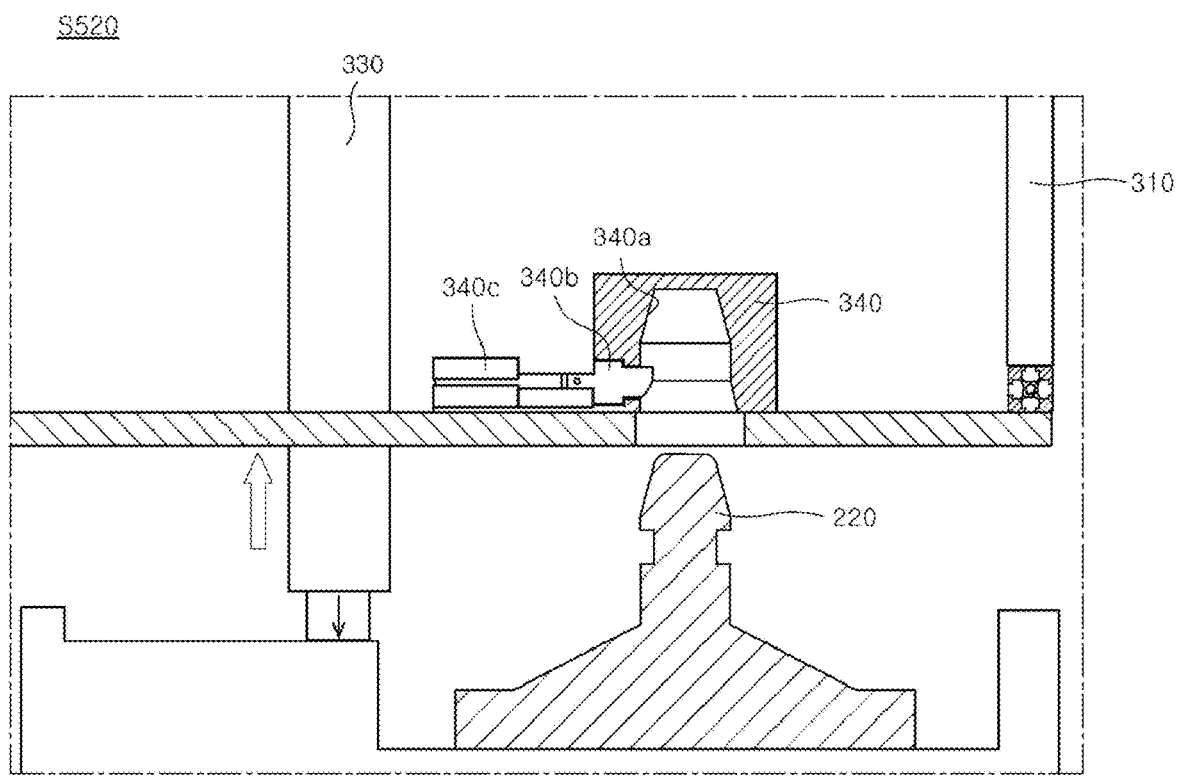
Figure 14:
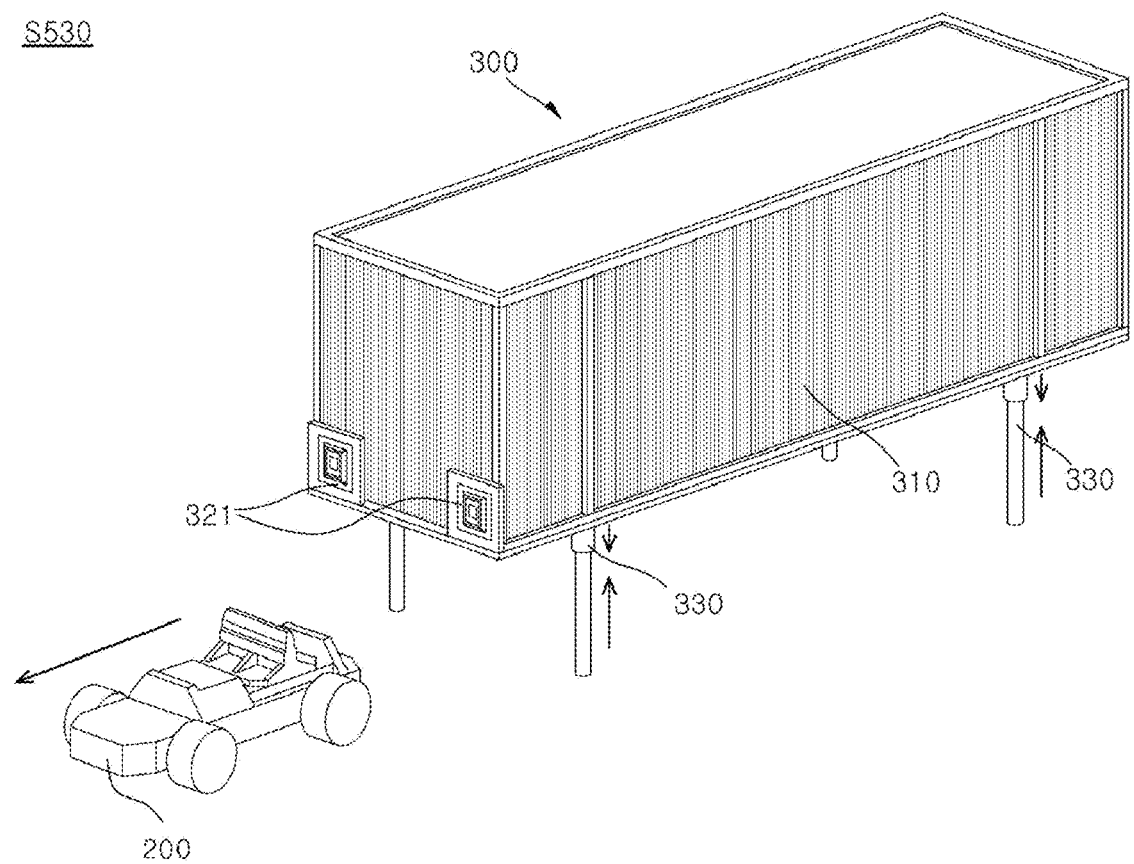
Figure 15:
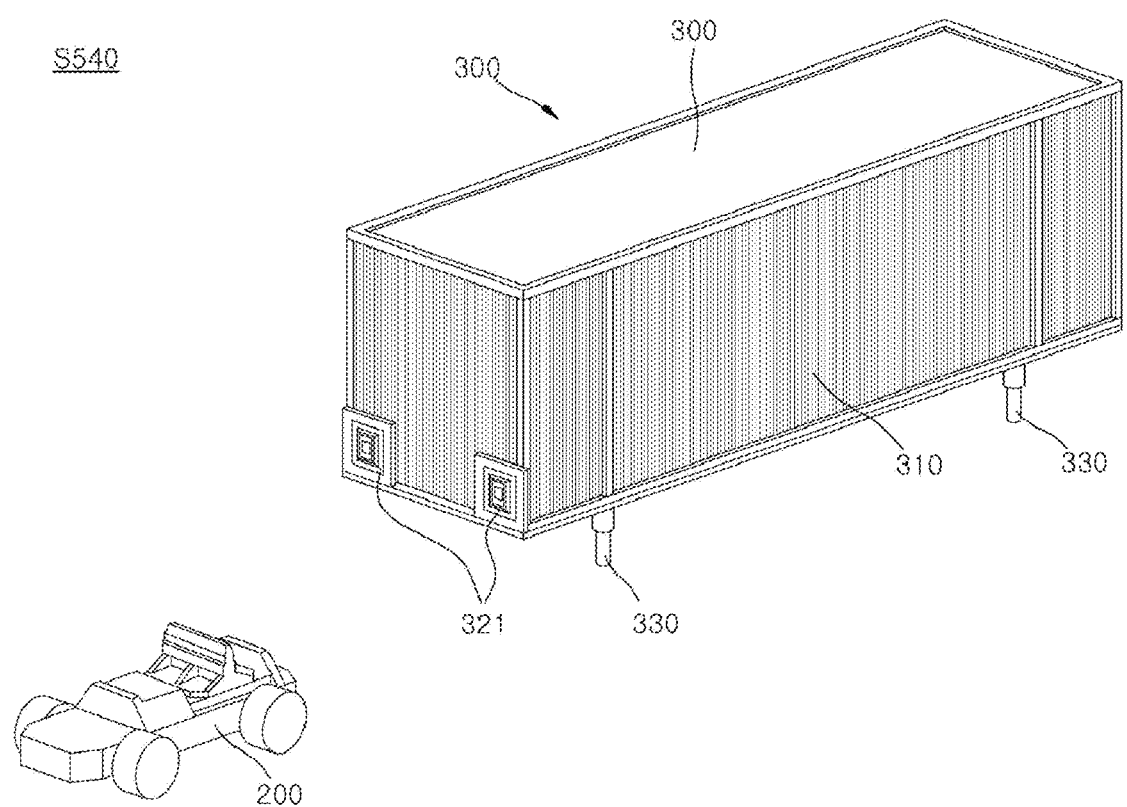

FIG. 7 is a flow diagram of one embodiment of a container transportation method using autonomous driving according to the present invention. Referring to FIG. 7, the container transportation method using autonomous driving according to the present invention includes a transport information transmission step S100, an autonomous vehicle moving step S200, a coupling step S300, a container transport step S400, and an uncoupling step S500. In the following, the container transportation method using autonomous driving according to the present invention will be described in detail with reference to FIG. 8 to FIG. 15 along with FIG. 7.

In the transport information transmission step S100, the server communication unit 120 of the management server 100 communicates with the vehicle communication unit 270 of the autonomous vehicle 200 to transmit server data described above to the vehicle communication unit 270, wherein the server data includes container transport information, container weight information, and code information attached to the container 300 and the autonomous vehicle 200 (a vehicle code 230 and a container code 320).

In the autonomous vehicle moving step S200, the autonomous vehicle 200 moves to a storage location at which the container 300 is stored based on the server data. Specifically, the autonomous vehicle moving step S200 includes a vehicle body pairing step and a driving step.

The vehicle body pairing step is performed when the vehicle body 210 includes at least two vehicle bodies 210, wherein two of the vehicle bodies 210 are paired with each other.

In the driving step, the pair of vehicle bodies 210 is moved to the storage location at which the container 300 to be transported is stored.

In the coupling step S300, the autonomous vehicle 200 is coupled to the container 300. Specifically, the coupling step S300 includes a container code recognition step, a first container body lifting step S310, a docking preparation step S320, a first container body lowering step S330, and a docking step S340, which will be described below with reference to FIG. 8 to FIG. 11.

First, in the container code recognition step, the container code recognition unit 260 recognizes a container identification code 321 attached to the container 300 to identify whether the recognized container 300 is a target container 300 to be transported.

When the container 300 recognized in the container code recognition step is identified as the target container 300 to be transported, the vehicle communication unit 270 transmits container code recognition information to the server communication unit 120 and the control command generation unit 130 generates a first container body lifting command to adjust the height adjustment pillar 330 to a longer length and transmits the generated first container body lifting command to the container communication unit 350.

In the first container body lifting step S310, based on the first container body lifting command transmitted to the container communication unit 350, the height adjustment pillar 330 is adjusted to a longer length to lift the container body 310 from the ground such that the autonomous vehicle 200 can enter a space between the container body 310 and the ground.

In the docking preparation step S320, the vehicle body 210 is moved to a position under the container body 310. Here, the container code recognition unit 260 recognizes the container position code 322 to allow the vehicle body 210 to be aligned with the lower surface of the container 300 such that the container coupling part 220 can be inserted into the vehicle coupling part 340.

In the first container body lowering step S330, the height adjustment pillar 330 is adjusted to a shorter length such that the lower surface of the container body 310 is brought into contact with the upper surface of the vehicle body 210. Here, the control command generation unit 130 generates a first container body lowering command to adjust the height adjustment pillar 330 to a shorter length and transmits the generated first container body lowering command to the container communication unit 350, whereby length adjustment of the height adjustment pillar 330 is accomplished.

In the docking step S340, the container coupling part 220 is inserted into the vehicle coupling part 340, whereby the vehicle body 210 is coupled to the container body 310.

In the container transport step S400, the autonomous vehicle 200 transports the container 300 to the transport destination based on the transport information.

In the uncoupling step S500, the autonomous vehicle 200 is uncoupled from the container 300. Specifically, the uncoupling step S500 includes an undocking step S510, a second container body lifting step S520, a vehicle body moving step S530, and a second container body lowering step S540, which will be described below with reference to FIG. 12 to FIG. 15.

In the undocking step S510, the vehicle coupling part 340 is uncoupled from the container coupling part 220. Here, when the management server 100 receives information indicating completion of transport of the container 300 to the transport destination from the container communication unit 350 or the vehicle communication unit 270, the control command generation unit 130 generates an undocking command to uncouple the vehicle coupling part 340 from the container coupling part 220 and transmits the generated undocking command to the container communication unit 350, whereby the vehicle coupling part 340 is uncoupled from the container coupling part 220.

Here, the container communication unit 350 transmits undocking information indicating completion of uncoupling of the vehicle coupling part 340 from the container coupling part 220 to the server communication unit 120, and the control command generation unit 130 generates a second container body lifting command to adjust the height adjustment pillar 330 to a longer length and transmits the generated second container body lifting command to the container communication unit 350.

In the second container body lifting step S520, based on the second container body lifting command transmitted to the container communication unit 350, the height adjustment pillar 330 is adjusted to a longer length to lift the container body 310 from the ground such that the autonomous vehicle 200 can move between the container body 310 and the ground.

In the vehicle body moving step S530, the vehicle body 210 is moved from a position under the container body 310 to a position outside the container body 310.

In the second container body lowering step S540, the height adjustment pillar 330 is adjusted to a shorter length to allow the lower surface of the container body 310 to meet the ground, whereby the container 300 is secured at the transport destination and transport of the container 300 is completed. Then, transport completion information may be transmitted from the container communication unit 350 or the vehicle communication unit 270 to the server communication unit 120.

Figure 16:
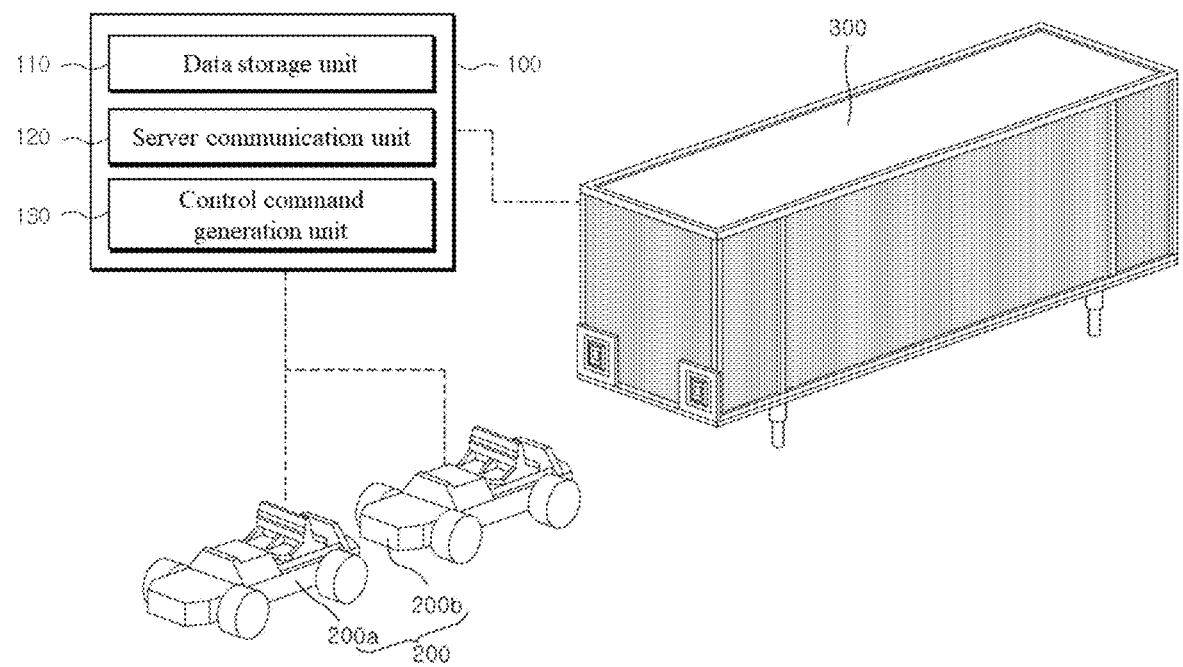
FIG. 16 is an overall schematic diagram of another embodiment of the container transportation system using autonomous driving according to the present invention.

FIG. 16 is a schematic diagram of another embodiment of the container transportation system using autonomous driving according to the present invention. Referring to FIG. 16, the container transportation system using autonomous driving according to the present invention includes a management server 100, an autonomous vehicle 200, and a container 300. In the following, the container transportation system using autonomous driving according to the present invention will be described with reference to FIG. 17 and FIG. 18 along with FIG. 16.

The management server 100 stores server data for controlling travelling of the autonomous vehicle 200 and operating the container 300 to control travelling of the autonomous vehicle 200 and operate the container 300. Specifically, the management server 100 includes a data storage unit 110, a server communication unit 120, and a control command generation unit 130.

The data storage unit 110 stores server data for controlling travelling of the autonomous vehicle 200 and operating the container 300. The server data includes container transport information, container weight information, and code information attached to the container 300 and the autonomous vehicle 200 (a vehicle code 230 and a container code 320 described below).

The container transport information includes a storage location at which the container 300 to be transported is stored, a transport destination to which the container 300 is to be transported, a transport completion time by which the container 300 is to be transported to the transport destination, and an estimated transport time for the container 300 from the storage location to the transport destination.

The container weight information is information about an actual weight of the container 300 according to the weight of loads stored in the container 300.

The code information includes information about a container code 320 unique to the container 300 to be transported and a vehicle code 230 unique to the autonomous vehicle 200 responsible for transporting the container 300.

Description of the server communication unit 120 and the control command generation unit 130 of the management server 100 will be given after describing the autonomous vehicle 200 and the container 300 in detail.

The autonomous vehicle 200 is docked with or undocked from the container 300 to be transported, and autonomously travels to transport the container 300 from the storage location to the transport destination. The autonomous vehicle 200 includes at least two autonomous vehicles.

Figure 17:
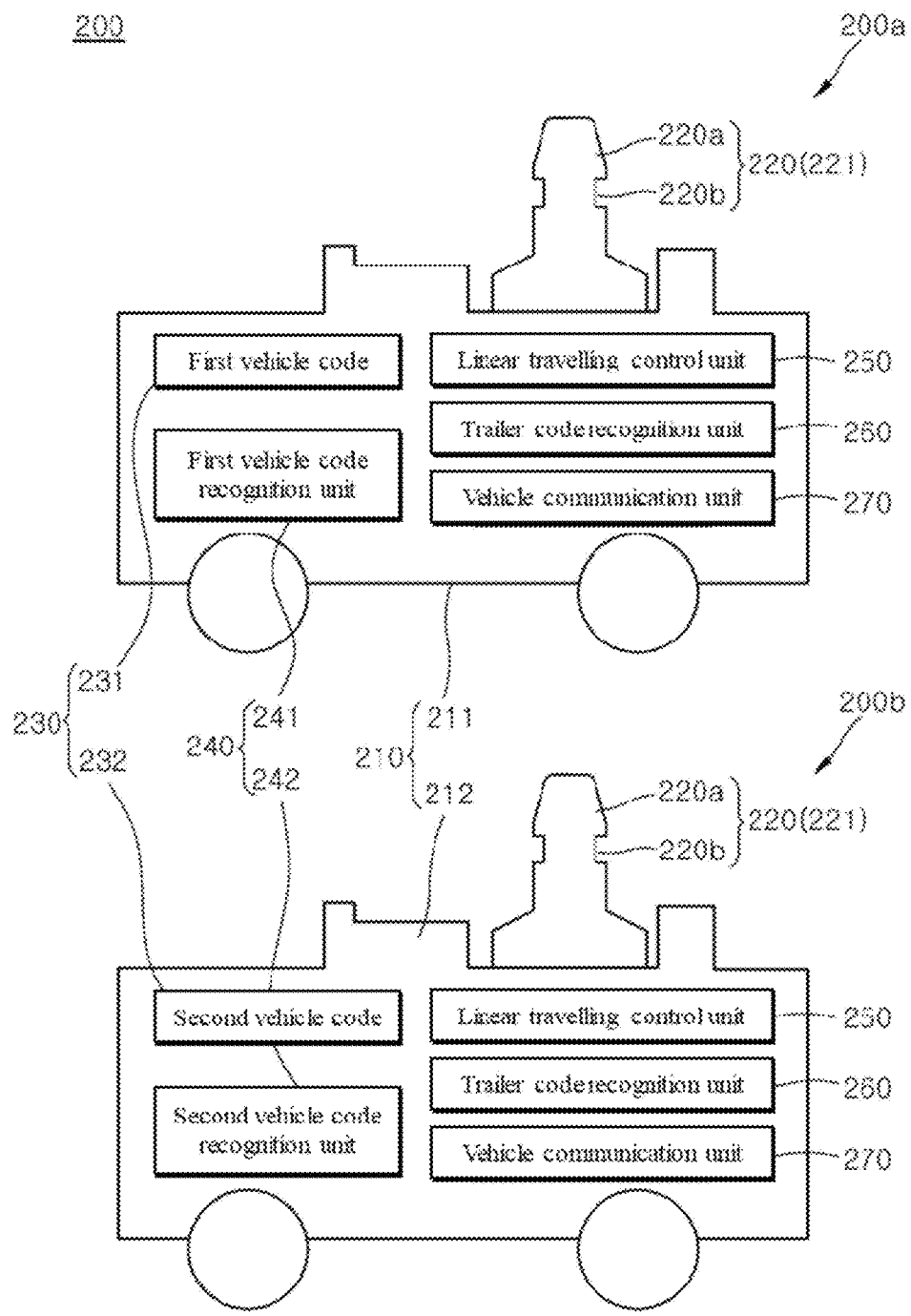
FIG. 17 is a schematic diagram of an autonomous vehicle of the other embodiment of the container transportation system using autonomous driving according to the present invention.

FIG. 17 is a schematic diagram of the autonomous vehicle 200 of the container transportation system using autonomous driving according to the present invention. Referring to FIG. 17, the autonomous vehicle 200 includes a vehicle body 210, a container coupling part 220, a vehicle code 230, a vehicle code recognition unit 240, a linear travelling control unit 250, a container code recognition unit 260, and a vehicle communication unit 270.

The vehicle body 210 is a self-driving car and has an upper surface adapted for the container 300 to be placed thereon to support the container 300 and transport the container 300 to the transport destination. The vehicle body 210 includes a plurality of vehicle bodies travelling in a line with one behind another.

Here, the upper surface of the vehicle body 210 is formed in a planar shape to secure a large contact area between the upper surface of the vehicle body 210 and a lower surface of the container 300 upon placement of the container 300 on the upper surface of the vehicle body 210 and to allow the container 300 to remain balanced during transport.

The container coupling part 220 protrudes from the upper surface of each vehicle body 210 to be coupled to a lower portion of the container 300. When the autonomous vehicle 200 includes a first autonomous vehicle 200a and a second autonomous vehicle 200b, the vehicle body 210 includes a first vehicle body 211 and a second vehicle body 212, and the container coupling part 220 includes a first container coupling part 221 attached to the first vehicle body 211 and a second container coupling part 222 attached to the second vehicle body 212. Specifically, the container coupling part 220 includes a docking body 220a and a groove 220b.

The docking body 220a has a lower portion coupled to the upper surface of the vehicle body 210 and an upper portion having a curved shape or having a side surface cut at a predetermined angle.

The groove 220b is formed at a center of the docking body 220a such that the center of the docking body 220a is smaller in length and area than upper and lower surfaces of the docking body 220a.

The vehicle code 230 stores unique information (identity) for each of the vehicle bodies 210. A different vehicle code 230 is attached to each of the vehicle bodies 210.

The vehicle code recognition unit 240 is attached to each of the vehicle bodies 210 to recognize the vehicle code 230 of a companion vehicle body 210 travelling in a line with a corresponding vehicle body.

For example, as the autonomous vehicle 200 includes the first autonomous vehicle 200a and the second autonomous vehicle 200b, the vehicle body 210 includes the first vehicle body 211 and the second vehicle body 212, the vehicle code 230 includes a first vehicle code 231 attached to the first vehicle body 211 and a second vehicle code 232 attached to the second vehicle body 212, and the vehicle code recognition unit 240 includes a first vehicle code recognition unit 241 and a second vehicle code recognition unit 242.

Here, the first vehicle code recognition unit 241 is attached to the first vehicle body 211 to recognize the second vehicle code 232 attached to the second vehicle body 212, which is a companion vehicle body travelling in a line with the first vehicle body 211, and the second vehicle code recognition unit 242 is attached to the second vehicle body 211 to recognize the first vehicle code 231 attached to the first vehicle body 211, which is a companion vehicle body travelling in a line with the second vehicle body 211.

As the first vehicle code recognition unit 241 and the second vehicle code recognition unit 242 recognize the second vehicle code 232 and the first vehicle code 231, respectively, the first vehicle body 211 and the second vehicle body 212 are paired with each other to travel in a single line.

The linear travelling control unit 250 is disposed in each of the first vehicle body 211 and the second vehicle body 212 such that the first vehicle body 211 and the second vehicle body 212 paired with each other can travel in a line with one behind the other.

The linear travelling control unit 250 includes multiple sensors including a camera, an odometer, a strain gauge, a radar, and the like, such that the first vehicle body 211 and the second vehicle body 212 can travel in a single line while sharing driving information thereof with each other.

The container code recognition unit 260 recognizes a container code 320 attached to the container 300 to be transported, which will be described further below along with description of the container 300.

The vehicle communication unit 270 communicates with the server communication unit 120 to receive the server data from the server communication unit 120 to enable the vehicle body 210 to transport the container 300 from the storage location to the transport destination.

In addition, the vehicle communication unit 270 transmits pairing status information of the vehicle body 210 and container code recognition information to the server communication unit 120, which will be described further below.

The container 300 is transported from the storage location to the transport destination by the autonomous vehicle 200. Specifically, the container 300 includes a container body 310, a container code 320, a height adjustment pillar 330, a pillar length adjustment unit (not shown), a vehicle coupling part 340, and a container communication unit 350.

Figure 18:
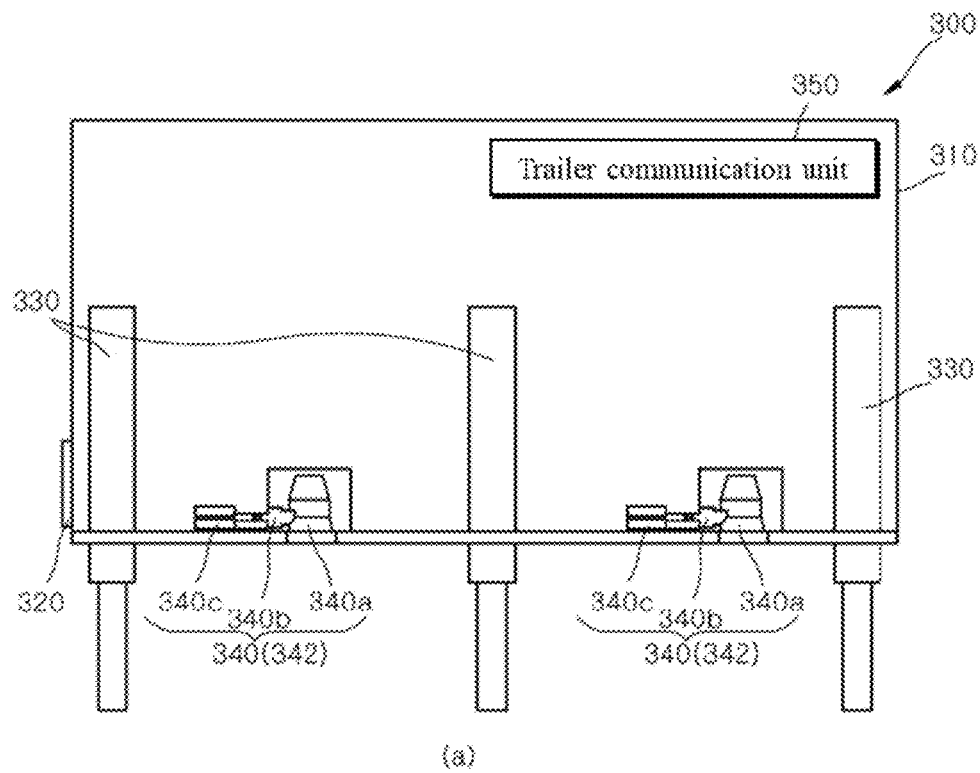
FIG. 18 is a schematic diagram of a container of the other embodiment of the container transportation system using autonomous driving according to the present invention.
Figure 18:
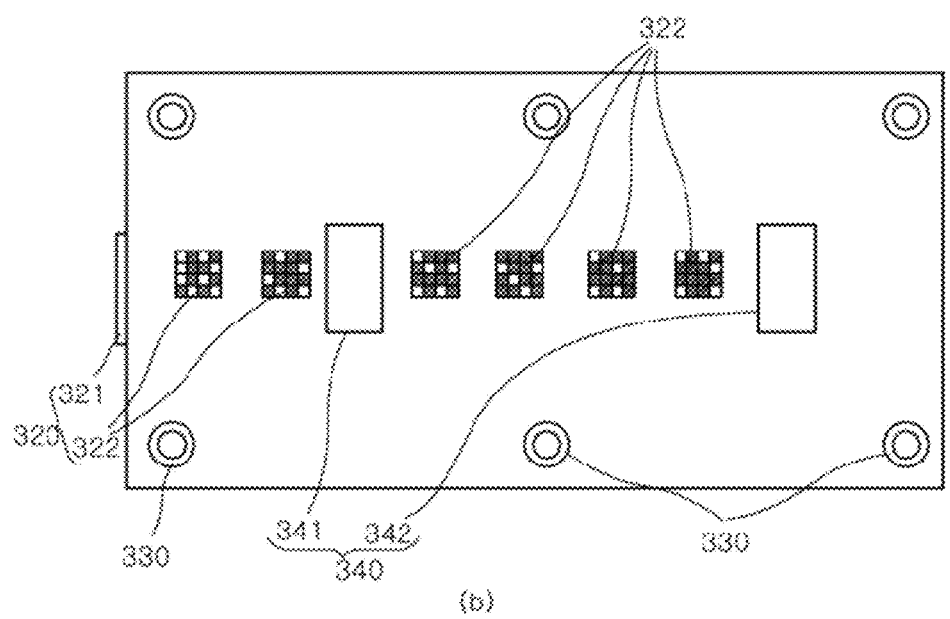

FIG. 18 is a schematic view of the container 300 of the container transportation system using autonomous driving according to the present invention, wherein FIG. 18(a) is a side view of the container 300 and FIG. 18(b) is a bottom view of the container 300. As shown in FIG. 18, loads are loaded inside the container body 310.

The container code 320 is attached to an outer side of the container body 310. Specifically, the container code 320 includes a container identification code 321 and a container position code 322.

The container identification code 321 is a code attached to the container body 310 to identify whether the container 300 is a target container 300 to be transported by the autonomous vehicle 200, and is disposed on a side surface of the container body 310.

The container position code 322 is a code guiding a position of the vehicle coupling part 340 to allow the container coupling part 220 of the autonomous vehicle 200 to be aligned with the vehicle coupling part 340, and is disposed on an underside of the container body 310.

The height adjustment pillar 330 is coupled to an edge of a lower surface of the container body 310 and is adjustable in length to move the container body 310 up (or down) from (or to) the ground.

The pillar length adjustment unit adjusts the length of the height adjustment pillar 330. An example of how the pillar length adjustment unit adjusts the length of the height adjustment pillar 330 will be described further below.

The vehicle coupling part 340 includes at least two vehicle coupling parts 340 formed at a center of the lower surface of the container body 310 and allowing a corresponding one of the container coupling parts 220 to be inserted thereinto and coupled thereto.

That is, the vehicle coupling part 340 includes a first vehicle coupling part 341 coupled to the first container coupling part 221 and a second vehicle coupling part 342 coupled to the second container coupling part 222. Specifically, the vehicle coupling part 340 includes an insertion hole 340a, a fastening bar 340b, and a spring 340c.

The insertion hole 340a is formed on the lower surface of the container body 310 in a shape corresponding to the shape of the docking body 220a such that the docking body 220a can be inserted into the insertion hole 340a.

The fastening bar 340b is disposed at a side of the insertion hole 340a, wherein at least a portion of the fastening bar 340b protrudes into the insertion hole 340a and the other portion of the fastening bar 340b is connected to the spring 340c.

That is, as the docking body 220a is inserted into the insertion hole 340a, the fastening bar 340b is pressed by the docking body 220a to be moved in a direction away from the insertion hole 340a and then, when the fastening bar 340b and the groove 220b are positioned in parallel to each other as the docking body 220a is fully inserted into the insertion hole 340a, the fastening bar 340b is moved back toward the insertion hole 340a by restoring force of the spring 340c to be inserted into the groove 220b. As a result, the vehicle coupling part 340 is coupled to the container coupling part 220, whereby the autonomous vehicle 200 is coupled to the container body 310.

The container communication unit 350 communicates with the server communication unit 120 to transmit the container weight information and information indicating completion of coupling between the vehicle coupling part 340 and the container coupling part 220 to the server communication unit 120 of the management server 100.

In the following, the server communication unit 120 and the control command generation unit 130 of the management server 100 will be described.

The server communication unit 120 communicates with the vehicle communication unit 270 and the container communication unit 350 to transmit the server data to the autonomous vehicle 200. In addition, the server communication unit 120 receives the pairing status information of the vehicle body 210 and the container code recognition information from the vehicle communication unit 270 and receives the container weight information and the information indicating completion of coupling between the vehicle coupling part 340 and the container coupling part 220 from the container communication unit 350.

The control command generation unit 130 generates a control command to operate the autonomous vehicle 200 and the container 300 based on the information received from the vehicle communication unit 270 and the container communication unit 350.

Since details of other components of this embodiment of the container transportation system using autonomous driving according to the present invention are the same as that of the above embodiment of the container transportation system using autonomous driving according to the present invention, description thereof will be omitted.

Another embodiment of the container transportation method using autonomous driving according to the present invention includes a transport information transmission step S100, an autonomous vehicle moving step S200, a coupling step S300, a container transport step S400, and an uncoupling step S500. In the following, the container transportation method using autonomous driving according to this embodiment will be described in detail.

In the transport information transmission step S100, the server communication unit 120 of the management server 100 communicates with the vehicle communication unit 270 of the autonomous vehicle 200 to transmit server data as described above to the vehicle communication unit 270, wherein the server data includes container transport information, container weight information, and code information attached to the container 300 and the autonomous vehicle 200 (a vehicle code 230 and a container code 320).

In the autonomous vehicle moving step S200, based on the server data, the autonomous vehicle 200 moves to a storage location at which the container 300 is stored. Specifically, the autonomous vehicle moving step S200 includes a vehicle body pairing step and a driving step.

In the vehicle body pairing step, two of the multiple vehicle bodies 210 are paired with each other.

For example, when the vehicle body 210 includes a first vehicle body 211 and a second vehicle body 212, the first vehicle code recognition unit 241 and the second vehicle code recognition unit 242 recognize the second vehicle code 232 and the first vehicle code 231, respectively, such that the first vehicle body 211 and the second vehicle body 212 are paired with each other to transport one container 300.

In the driving step, the pair of vehicle bodies 210 (the first vehicle body 211 and the second vehicle body 212) is moved to the storage location of the container 300 to be transported. Here, the first vehicle body 211 and the second vehicle body 212 travel in a single line while sharing driving information thereof with each other via the linear travelling control unit 250.

Since the coupling step S300, the container transport step S400, and the uncoupling step S500 are the same as described in the above embodiment of the container transportation method using autonomous driving according to the present invention, description thereof will be omitted.

Although some embodiments have been described herein, it should be understood that these embodiments are provided for illustration only and are not to be construed in any way as limiting the invention, and that various modifications, changes, alterations, and equivalent embodiments can be made by those skilled in the art without departing from the spirit and scope of the invention. In addition, it should be understood that such modifications are not to be understood as being separate from the technical idea or prospect of the invention.

The container transportation system using autonomous driving and the container transportation method using autonomous driving according to the present invention may be applied to a container transportation system that enables fast delivery of goods by reducing a time for coupling a transportation vehicle to a container using autonomous driving technology in which an autonomous vehicle automatically docks with a container and autonomously travels to transport the container to a transport destination.

The invention claimed is:

1. A container transportation system using autonomous driving, comprising:
   a container to be transported;
   an autonomous vehicle docked with or undocked from the container and autonomously travelling to transport the container to a transport destination; and
   a management server controlling travelling of the autonomous vehicle,
   wherein the autonomous vehicle comprises a vehicle body and a container coupling part coupled to the container, the container coupling part comprising:
      a docking body having a lower portion coupled to an upper surface of the vehicle body and an upper portion having one of a curved shape or a side surface cut at a predetermined angle; and
      a groove formed at a center of the docking body such that a center of the docking body is smaller in length and area than upper and lower surfaces of the docking body, wherein the container comprises:
      a container body;
      a plurality of height adjustment pillars coupled to respective corners of a lower surface of the container body and adjustable in length to lift or lower the container body from or to the ground; and
      a vehicle coupling part formed on the lower surface of the container body and coupled to the container coupling part, the vehicle coupling part comprising:
         an insertion hole formed on the lower surface of the container body in a shape corresponding to a shape of the container coupling part;
         a fastening bar disposed at a side of the insertion hole, wherein at least a portion of the fastening bar protrudes into the insertion hole; and
         a spring connected to another portion of the fastening bar.

2. The container transportation system according to claim 1, wherein the container further comprises:
   a container code attached to an outer side of the container body; and
   a pillar length adjustment unit adjusting a length of the height adjustment pillar.

3. The container transportation system according to claim 2, wherein the autonomous vehicle further comprises:
   a vehicle code attached to the vehicle body;

a vehicle code recognition unit recognizing the vehicle code; and a container code recognition unit recognizing the container code.

4. A container transportation system using autonomous driving, comprising:

a container to be transported;

at least two autonomous vehicles docked with or undocked from the container and autonomously travelling to transport the container to a transport destination; and a management server controlling travelling of the autonomous vehicles, wherein each of the autonomous vehicles comprises a vehicle body and a container coupling part coupled to the container, the container coupling part comprising:

a docking body having a lower portion coupled to an upper surface of the vehicle body and an upper portion having one of a curved shape or a side surface cut at a predetermined angle; and a groove formed at a center of the docking body such that a center of the docking body is smaller in length and area than upper and lower surfaces of the docking body, wherein the container comprises:

a container body;

a plurality of height adjustment pillars coupled to respective corners of a lower surface of the container body and adjustable in length to lift or lower the container body from or to the ground; and at least two vehicle coupling parts formed on the lower surface of the container body and coupled to the respective container coupling parts, each vehicle coupling part comprising:

an insertion hole formed on the lower surface of the container body in a shape corresponding to a shape of the container coupling part;

a fastening bar disposed at a side of the insertion hole, wherein at least a portion of the fastening bar protrudes into the insertion hole; and a spring connected to another portion of the fastening bar.

5. A container transportation method using autonomous driving based on a container transportation system using autonomous driving, comprising:

transmitting, by a management server, transport information of a container to be transported by an autonomous vehicle to the autonomous vehicle;

moving the autonomous vehicle to a location at which the container is stored based on the transport information;

coupling the autonomous vehicle to the container, wherein the autonomous vehicle comprises a vehicle body and a container coupling part coupled to the container, the container coupling part comprising:

a docking body having a lower portion coupled to an upper surface of the vehicle body and an upper portion having one of a curved shape or a side surface cut at a predetermined angle; and a groove formed at a center of the docking body such that a center of the docking body is smaller in length and area than upper and lower surfaces of the docking body, wherein the container comprises a container body and a vehicle coupling part, the vehicle coupling part comprising:

an insertion hole formed on the lower surface of the container body in a shape corresponding to a shape of the container coupling part;

a fastening bar disposed at a side of the insertion hole, wherein at least a portion of the fastening bar protrudes into the insertion hole; and a spring connected to another portion of the fastening bar, wherein the fastening bar is configured to:

be pressed by the container coupling part to move in a direction away from the insertion hole as the container coupling part is inserted into the insertion hole, and move back toward the insertion hole by restoring force of the spring to be inserted into the groove as the fastening bar and the groove are positioned in parallel to each other;

transporting, by the autonomous vehicle, the container to a transport destination based on the transport information; and uncoupling the autonomous vehicle from the container.

* * * * *